(12) United States Patent
Hsia

(10) Patent No.: US 11,510,296 B2
(45) Date of Patent: Nov. 22, 2022

(54) LINEAR SOLID-STATE LIGHTING WITH A PULSE TRAIN CONTROL

(71) Applicant: Aleddra Inc., Renton, WA (US)

(72) Inventor: Chungho Hsia, Bellevue, WA (US)

(73) Assignee: Aleddra Inc., Renton, WA (US)

( * ) Notice: Subject to any disclaimer, the term of this patent is extended or adjusted under 35 U.S.C. 154(b) by 0 days.

(21) Appl. No.: 17/839,179

(22) Filed: Jun. 13, 2022

(65) Prior Publication Data

US 2022/0312560 A1 Sep. 29, 2022

Related U.S. Application Data

(63) Continuation-in-part of application No. 17/735,002, filed on May 2, 2022, which is a continuation-in-part of application No. 17/717,838, filed on Apr. 11, 2022, which is a continuation-in-part of application No. 17/696,780, filed on Mar. 16, 2022, which is a continuation-in-part of application No. 17/405,203,
(Continued)

(51) Int. Cl.
| | |
|---|---|
| *G05F 1/00* | (2006.01) |
| *H05B 45/32* | (2020.01) |
| *F21V 23/00* | (2015.01) |
| *F21S 9/02* | (2006.01) |
| *H05B 45/38* | (2020.01) |
| *F21Y 115/10* | (2016.01) |

(52) U.S. Cl.
CPC .............. *H05B 45/32* (2020.01); *F21S 9/02* (2013.01); *F21V 23/003* (2013.01); *H05B 45/38* (2020.01); *F21Y 2115/10* (2016.08)

(58) Field of Classification Search
CPC ........ H05B 45/32; H05B 45/38; H05B 47/18; H05B 45/355; H05B 47/19; H05B 45/12; H05B 45/14; H05B 45/30; H05B 45/00; F21V 23/003; F21S 9/02; F21Y 2115/10; H02J 7/04
See application file for complete search history.

(56) References Cited

U.S. PATENT DOCUMENTS

| | | | | |
|---|---|---|---|---|
| 6,502,044 B1 * | 12/2002 | Lane | ..................... | H02J 9/005 363/101 |
| 2005/0063194 A1 * | 3/2005 | Lys | .......................... | B60Q 3/85 362/489 |
| 2013/0127362 A1 * | 5/2013 | Trainor | ................... | G01R 31/44 324/414 |

* cited by examiner

*Primary Examiner* — Omar Rojas Cadima
(74) *Attorney, Agent, or Firm* — Han IP PLLC; Andy M. Han

(57) ABSTRACT

A light-emitting diode (LED) lamp comprising a normally-operated portion and an emergency-operated portion is used to replace a luminaire operated only in a normal mode with alternate-current (AC) mains. The normally-operated portion comprises a second driving circuit whereas the emergency-operated portion comprises a rechargeable battery, a first driving circuit, a self-diagnostic circuit, and a control circuit. The LED lamp can auto-switch between the normal mode and an emergency mode according to availability of the AC mains and whether a rechargeable battery test is initiated. The control circuit is configured to produce a pulse train with a predetermined duty cycle to operate the first driving circuit while disabling the second driving circuit to eliminate operational ambiguity during the rechargeable battery test. The self-diagnostic circuit is configured to provide multiple sequences and to auto-evaluate battery performance by sending the pulse train to operate the first driving circuit according to the multiple sequences.

19 Claims, 4 Drawing Sheets

Related U.S. Application Data filed on Aug. 18, 2021, now Pat. No. 11,283,291, which is a continuation-in-part of application No. 17/329,018, filed on May 24, 2021, now Pat. No. 11,303,151, which is a continuation-in-part of application No. 17/313,988, filed on May 6, 2021, now Pat. No. 11,264,831, which is a continuation-in-part of application No. 17/213,519, filed on Mar. 26, 2021, now Pat. No. 11,271,422, which is a continuation-in-part of application No. 17/151,606, filed on Jan. 18, 2021, now Pat. No. 11,259,386, which is a continuation-in-part of application No. 17/122,942, filed on Dec. 15, 2020, now Pat. No. 11,265,991, which is a continuation-in-part of application No. 17/099,450, filed on Nov. 16, 2020, now Pat. No. 11,264,830, which is a continuation-in-part of application No. 17/076,748, filed on Oct. 21, 2020, now Pat. No. 11,271,388, which is a continuation-in-part of application No. 17/026,903, filed on Sep. 21, 2020, now Pat. No. 11,271,421, which is a continuation-in-part of application No. 17/016,296, filed on Sep. 9, 2020, now Pat. No. 11,259,374, which is a continuation-in-part of application No. 16/989,016, filed on Aug. 10, 2020, now Pat. No. 11,122,658, which is a continuation-in-part of application No. 16/929,540, filed on Jul. 15, 2020, now Pat. No. 11,116,057, which is a continuation-in-part of application No. 16/904,206, filed on Jun. 17, 2020, now Pat. No. 11,102,864, which is a continuation-in-part of application No. 16/880,375, filed on May 21, 2020, now Pat. No. 11,172,551, which is a continuation-in-part of application No. 16/861,137, filed on Apr. 28, 2020, now Pat. No. 10,992,161, which is a continuation-in-part of application No. 16/830,198, filed on Mar. 25, 2020, now Pat. No. 10,869,373, which is a continuation-in-part of application No. 16/735,410, filed on Jan. 6, 2020, now Pat. No. 10,660,179, which is a continuation-in-part of application No. 16/694,970, filed on Nov. 25, 2019, now Pat. No. 10,602,597, which is a continuation-in-part of application No. 16/681,740, filed on Nov. 12, 2019, now Pat. No. 10,959,310, which is a continuation-in-part of application No. 16/664,034, filed on Oct. 25, 2019, now Pat. No. 10,660,184, which is a continuation-in-part of application No. 16/572,040, filed on Sep. 16, 2019, now Pat. No. 10,645,782, which is a continuation-in-part of application No. 16/547,502, filed on Aug. 21, 2019, now Pat. No. 10,485,073, which is a continuation-in-part of application No. 16/530,747, filed on Aug. 2, 2019, now Pat. No. 10,492,265, which is a continuation-in-part of application No. 16/458,823, filed on Jul. 1, 2019, now Pat. No. 10,485,065, which is a continuation-in-part of application No. 16/432,735, filed on Jun. 5, 2019, now Pat. No. 10,390,396, which is a continuation-in-part of application No. 16/401,849, filed on May 2, 2019, now Pat. No. 10,390,395, which is a continuation-in-part of application No. 16/296,864, filed on Mar. 8, 2019, now Pat. No. 10,390,394, which is a continuation-in-part of application No. 16/269,510, filed on Feb. 6, 2019, now Pat. No. 10,314,123, which is a continuation-in-part of application No. 16/247,456, filed on Jan. 14, 2019, now Pat. No. 10,327,298, which is a continuation-in-part of application No. 16/208,510, filed on Dec. 3, 2018, now Pat. No. 10,237,946, which is a continuation-in-part of application No. 16/154,707, filed on Oct. 8, 2018, now Pat. No. 10,225,905, which is a continuation-in-part of application No. 15/947,631, filed on Apr. 6, 2018, now Pat. No. 10,123,388, which is a continuation-in-part of application No. 15/911,086, filed on Mar. 3, 2018, now Pat. No. 10,136,483, which is a continuation-in-part of application No. 15/897,106, filed on Feb. 14, 2018, now Pat. No. 10,161,616, which is a continuation-in-part of application No. 15/874,752, filed on Jan. 18, 2018, now Pat. No. 10,036,515, which is a continuation-in-part of application No. 15/836,170, filed on Dec. 8, 2017, now Pat. No. 10,021,753, and a continuation-in-part of application No. 15/649,392, filed on Jul. 13, 2017, now Pat. No. 9,986,619, which is a continuation-in-part of application No. 15/444,536, filed on Feb. 28, 2017, now Pat. No. 9,826,595, which is a continuation-in-part of application No. 15/362,772, filed on Nov. 28, 2016, now Pat. No. 9,967,927, which is a continuation-in-part of application No. 15/225,748, filed on Aug. 1, 2016, now Pat. No. 9,743,484, which is a continuation-in-part of application No. 14/818,041, filed on Aug. 4, 2015, now Pat. No. 9,420,663, which is a continuation-in-part of application No. 14/688,841, filed on Apr. 16, 2015, now Pat. No. 9,288,867, which is a continuation-in-part of application No. 14/465,174, filed on Aug. 21, 2014, now Pat. No. 9,277,603, which is a continuation-in-part of application No. 14/135,116, filed on Dec. 19, 2013, now Pat. No. 9,163,818, which is a continuation-in-part of application No. 13/525,249, filed on Jun. 15, 2012, now Pat. No. 8,749,167.

LINEAR SOLID-STATE LIGHTING WITH A PULSE TRAIN CONTROL

CROSS-REFERENCE TO RELATED APPLICATIONS

The present disclosure is part of a continuation-in-part (CIP) application of U.S. patent application Ser. No. 17/735,002, filed 2 May 2022, which is part of CIP application of U.S. patent application Ser. No. 17/717,838, filed 11 Apr. 2022, which is part of CIP application of U.S. patent application Ser. No. 17/696,780, filed 16 Mar. 2022, which is part of CIP application of U.S. patent application Ser. No. 17/405,203, filed 18 Aug. 2021 and issued as U.S. Pat. No. 11,283,291 on 22 Mar. 2022, which is part of CIP application of U.S. patent application Ser. No. 17/329,018, filed 24 May 2021 and issued as U.S. Pat. No. 11,303,151 on 12 Apr. 2022, which is part of CIP application of U.S. patent application Ser. No. 17/313,988, filed 6 May 2021 and issued as U.S. Pat. No. 11,264,831 on 1 Mar. 2022, which is part of CIP application of U.S. patent application Ser. No. 17/213,519, filed 26 Mar. 2021 and issued as U.S. Pat. No. 11,271,422 on 8 Mar. 2022, which is part of CIP application of U.S. patent application Ser. No. 17/151,606, filed 18 Jan. 2021 and issued as U.S. Pat. No. 11,259,386 on 22 Feb. 2022, which is part of CIP application of U.S. patent application Ser. No. 17/122,942, filed 15 Dec. 2020 and issued as U.S. Pat. No. 11,265,991 on 1 Mar. 2022, which is part of CIP application of U.S. patent application Ser. No. 17/099,450, filed 16 Nov. 2020 and issued as U.S. Pat. No. 11,264,830 on 1 Mar. 2022, which is part of CIP application of U.S. patent application Ser. No. 17/076,748, filed 21 Oct. 2020 and issued as U.S. Pat. No. 11,271,388 on 8 Mar. 2022, which is part of CIP application of U.S. patent application Ser. No. 17/026,903, filed 21 Sep. 2020 and issued as U.S. Pat. No. 11,271,421 on 8 Mar. 2022, which is part of CIP application of U.S. patent application Ser. No. 17/016,296, filed 9 Sep. 2020 and issued as U.S. Pat. No. 11,259,374 on 22 Feb. 2022, which is part of CIP application of U.S. patent application Ser. No. 16/989,016, filed 10 Aug. 2020 and issued as U.S. Pat. No. 11,122,658 on 14 Sep. 2021, which is part of CIP application of U.S. patent application Ser. No. 16/929,540, filed 15 Jul. 2020 and issued as U.S. Pat. No. 11,116,057 on 7 Sep. 2021, which is part of CIP application of U.S. patent application Ser. No. 16/904,206, filed 17 Jun. 2020 and issued as U.S. Pat. No. 11,102,864 on 24 Aug. 2021, which is part of CIP application of U.S. patent application Ser. No. 16/880,375, filed 21 May 2020 and issued as U.S. Pat. No. 11,172,551 on 9 Nov. 2021, which is part of CIP application of U.S. patent application Ser. No. 16/861,137, filed 28 Apr. 2020 and issued as U.S. Pat. No. 10,992,161 on 27 Apr. 2021, which is part of CIP application of U.S. patent application Ser. No. 16/830,198, filed 25 Mar. 2020 and issued as U.S. Pat. No. 10,869,373 on 15 Dec. 2020, which is part of CIP application of U.S. patent application Ser. No. 16/735,410, filed 6 Jan. 2020 and issued as U.S. Pat. No. 10,660,179 on 19 May 2020, which is part of CIP application of U.S. patent application Ser. No. 16/694,970, filed 25 Nov. 2019 and issued as U.S. Pat. No. 10,602,597 on 24 Mar. 2020, which is part of CIP application of U.S. patent application Ser. No. 16/681,740, filed 12 Nov. 2019 and issued as U.S. Pat. No. 10,959,310 on 23 Mar. 2021, which is part of CIP application of U.S. patent application Ser. No. 16/664,034, filed 25 Oct. 2019 and issued as U.S. Pat. No. 10,660,184 on 19 May 2020, which is part of CIP application of U.S. patent application Ser. No. 16/572,040, filed 16 Sep. 2019 and issued as U.S. Pat. No. 10,645,782 on 5 May 2020, which is part of CIP application of U.S. patent application Ser. No. 16/547,502, filed 21 Aug. 2019 and issued as U.S. Pat. No. 10,485,073 on 19 Nov. 2019, which is part of CIP application of U.S. patent application Ser. No. 16/530,747, filed 2 Aug. 2019 and issued as U.S. Pat. No. 10,492,265 on 26 Nov. 2019, which is part of CIP application of U.S. patent application Ser. No. 16/458,823, filed 1 Jul. 2019 and issued as U.S. Pat. No. 10,485,065 on 19 Nov. 2019, which is part of CIP application of U.S. patent application Ser. No. 16/432,735, filed 5 Jun. 2019 and issued as U.S. Pat. No. 10,390,396 on 20 Aug. 2019, which is part of CIP application of U.S. patent application Ser. No. 16/401,849, filed 2 May 2019 and issued as U.S. Pat. No. 10,390,395 on 20 Aug. 2019, which is part of CIP application of U.S. patent application Ser. No. 16/296,864, filed 8 Mar. 2019 and issued as U.S. Pat. No. 10,390,394 on 20 Aug. 2019, which is part of CIP application of U.S. patent application Ser. No. 16/269,510, filed 6 Feb. 2019 and issued as U.S. Pat. No. 10,314,123 on 4 Jun. 2019, which is part of CIP application of U.S. patent application Ser. No. 16/247,456, filed 14 Jan. 2019 and issued as U.S. Pat. No. 10,327,298 on 18 Jun. 2019, which is part of CIP application of U.S. patent application Ser. No. 16/208,510, filed 3 Dec. 2018 and issued as U.S. Pat. No. 10,237,946 on 19 Mar. 2019, which is part of CIP application of U.S. patent application Ser. No. 16/154,707, filed 8 Oct. 2018 and issued as U.S. Pat. No. 10,225,905 on 5 Mar. 2019, which is part of a CIP application of U.S. patent application Ser. No. 15/947,631, filed 6 Apr. 2018 and issued as U.S. Pat. No. 10,123,388 on 6 Nov. 2018, which is part of a CIP application of U.S. patent application Ser. No. 15/911,086, filed 3 Mar. 2018 and issued as U.S. Pat. No. 10,136,483 on 20 Nov. 2018, which is part of a CIP application of U.S. patent application Ser. No. 15/897,106, filed 14 Feb. 2018 and issued as U.S. Pat. No. 10,161,616 on 25 Dec. 2018, which is a CIP application of U.S. patent application Ser. No. 15/874,752, filed 18 Jan. 2018 and issued as U.S. Pat. No. 10,036,515 on 31 Jul. 2018, which is a CIP application of U.S. patent application Ser. No. 15/836,170, filed 8 Dec. 2017 and issued as U.S. Pat. No. 10,021,753 on 10 Jul. 2018, which is a CIP application of U.S. patent application of Ser. No. 15/649,392 filed 13 Jul. 2017 and issued as U.S. Pat. No. 9,986,619 on 29 May 2018, which is a CIP application of U.S. patent application Ser. No. 15/444,536, filed 28 Feb. 2017 and issued as U.S. Pat. No. 9,826,595 on 21 Nov. 2017, which is a CIP application of U.S. patent application Ser. No. 15/362,772, filed 28 Nov. 2016 and issued as U.S. Pat. No. 9,967,927 on 8 May 2018, which is a CIP application of U.S. patent application Ser. No. 15/225,748, filed 1 Aug. 2016 and issued as U.S. Pat. No. 9,743,484 on 22 Aug. 2017, which is a CIP application of U.S. patent application Ser. No. 14/818,041, filed 4 Aug. 2015 and issued as U.S. Pat. No. 9,420,663 on 16 Aug. 2016, which is a CIP application of U.S. patent application Ser. No. 14/688,841, filed 16 Apr. 2015 and issued as U.S. Pat. No. 9,288,867 on 15 Mar. 2016, which is a CIP application of U.S. patent application Ser. No. 14/465,174, filed 21 Aug. 2014 and issued as U.S. Pat. No. 9,277,603 on 1 Mar. 2016, which is a CIP application of U.S. patent application Ser. No. 14/135,116, filed 19 Dec. 2013 and issued as U.S. Pat. No. 9,163,818 on 20 Oct. 2015, which is a CIP application of U.S. patent application Ser. No. 13/525,249, filed 15 Jun. 2012 and issued as U.S. Pat. No. 8,749,167 on 10 Jun. 2014. Contents of the above-identified applications are incorporated herein by reference in their entirety.

BACKGROUND

Technical Field

The present disclosure relates to linear light-emitting diode (LED) lamps and more particularly to a linear LED lamp in which a pulse train is utilized to operate an emergency driving circuit and to auto-test discharging current of a rechargeable battery in operating such a dual mode LED lamp at all times.

Description of the Related Art

Solid-state lighting from semiconductor LEDs has received much attention in general lighting applications today. Because of its potential for more energy savings, better environmental protection (with no hazardous materials used), higher efficiency, smaller size, and longer lifetime than conventional incandescent bulbs and fluorescent tubes, the LED-based solid-state lighting will be a mainstream for general lighting in the near future. Meanwhile, as LED technologies develop with the drive for energy efficiency and clean technologies worldwide, more families and organizations will adopt LED lighting for their illumination applications. In this trend, the potential safety concerns such as risk of electric shock and fire become especially important and need to be well addressed.

In today's retrofit applications of an LED lamp to replace an existing fluorescent lamp, consumers may choose either to adopt a ballast-compatible LED lamp with an existing ballast used to operate the fluorescent lamp or to employ an alternate-current (AC) mains-operable LED lamp by removing/bypassing the ballast. Either application has its advantages and disadvantages. In the former case, although the ballast consumes extra power, it is straightforward to replace the fluorescent lamp without rewiring, which consumers have a first impression that it is the best alternative. But the fact is that total cost of ownership for this approach is high regardless of very low initial cost. For example, the ballast-compatible LED lamps work only with particular types of ballasts. If the existing ballast is not compatible with the ballast-compatible LED lamp, the consumer will have to replace the ballast. Some facilities built long time ago incorporate different types of fixtures, which requires extensive labor for both identifying ballasts and replacing incompatible ones. Moreover, the ballast-compatible LED lamp can operate longer than the ballast. When an old ballast fails, a new ballast will be needed to replace in order to keep the ballast-compatible LED lamps working. Maintenance will be complicated, sometimes for the lamps and sometimes for the ballasts. The incurred cost will preponderate over the initial cost savings by changeover to the ballast-compatible LED lamps for hundreds of fixtures throughout a facility. In addition, replacing a failed ballast requires a certified electrician. The labor costs and long-term maintenance costs will be unacceptable to end users. From energy saving point of view, a ballast constantly draws power, even when the ballast-compatible LED lamps are dead or not installed. In this sense, any energy saved while using the ballast-compatible LED lamps becomes meaningless with the constant energy use by the ballast. In the long run, the ballast-compatible LED lamps are more expensive and less efficient than self-sustaining AC mains-operable LED lamps.

On the contrary, an AC mains-operable LED lamp does not require a ballast to operate. Before use of the AC mains-operable LED lamp, the ballast in a fixture must be removed or bypassed. Removing or bypassing the ballast does not require an electrician and can be replaced by end users. Each AC mains-operable LED lamp is self-sustaining. Once installed, the AC mains-operable LED lamps will only need to be replaced after 50,000 hours. In view of above advantages and disadvantages of both the ballast-compatible LED lamps and the AC mains-operable LED lamps, it seems that market needs a most cost-effective solution by using a universal LED lamp that can be used with the AC mains and is compatible with a ballast so that LED lamp users can save an initial cost by changeover to such an LED lamp followed by retrofitting the lamp fixture to be used with the AC mains when the ballast dies.

Furthermore, the AC mains-operable LED lamps can easily be used with emergency lighting, which is especially important in this consumerism era. The emergency lighting systems in retail sales and assembly areas with an occupancy load of 100 or more are required by codes in many cities. Occupational Safety and Health Administration (OSHA) requires that a building's exit paths be properly and automatically lighted at least ninety minutes of illumination at a minimum of 10.8 lux so that an employee with normal vision can see along the exit route after the building power becomes unavailable. This means that emergency egress lighting must operate reliably and effectively during low visibility evacuations. To ensure reliability and effectiveness of backup lighting, building owners should abide by the National Fire Protection Association's (NFPA) emergency egress light requirements that emphasize performance, operation, power source, and testing. OSHA requires most commercial buildings to adhere to the NFPA standards or a significant fine. Meeting OSHA requirements takes time and investment, but not meeting them could result in fines and even prosecution. If a building has egress lighting problems that constitute code violations, the quickest way to fix is to replace existing lamps with multi-function LED lamps that have an emergency light package integrated with the normal lighting. The code also requires the emergency lights be inspected and tested to ensure they are in proper working conditions at all times. It is, therefore, the manufacturers' responsibility to design an LED lamp, an LED luminaire, or an LED lighting system with a self-diagnostic mechanism such that after the LED lamp or the LED luminaire is installed on a ceiling or a high place in a room, the self-diagnostic mechanism can work with an emergency battery backup system to periodically auto-test charging and discharging current to meet regulatory requirements without safety issues. In this disclosure, how to manage a proper emergency driving voltage and to reduce operating ambiguity will be well addressed.

SUMMARY

A linear LED lamp is used to replace a fluorescent or an LED lamp normally operated with the AC mains in a normal mode. The linear LED lamp comprises an emergency-operated portion and one or more LED arrays with a forward voltage across thereof. The emergency-operated portion comprises a rechargeable battery, a first driving circuit configured to use a power from the rechargeable battery and to provide an emergency power (i.e., a voltage and a current) to drive the one or more LED arrays when the line voltage from the AC mains is unavailable. The linear LED lamp further comprises a normally-operated portion originally designed to receive the line voltage from the AC mains for general lighting applications. The normally-operated portion comprises at least two electrical conductors "L" and "N", at least one full-wave rectifier, and a second driving circuit.

The at least one full-wave rectifier is configured to convert the line voltage from the AC mains into a primary direct-current (DC) voltage. In other words, the at least two electrical conductors "L" and "N" are coupled to an un-switched power, in which the normally-operated portion cannot be turned off when the linear LED lamp is not in use or during nighttime. This un-switched power ensures that the rechargeable battery always receives the un-switched power from the line voltage. The second driving circuit comprises a transformer and a power switching control circuit. The power switching control circuit is coupled to the at least one full-wave rectifier and configured to allow the second driving circuit to generate a second output voltage to power up the one or more LED arrays at a full power when the line voltage is available. The transformer comprises a ground reference, electrically isolated from a negative (−) port of the at least one full-wave rectifier. The one or more LED arrays comprises a first terminal LED+ and a second terminal LED− configured to receive an LED driving current from the first terminal LED+ and to return from the second terminal LED− to either the first driving circuit or the second driving circuit, depending on which one is an LED driving current source. The second driving circuit, a normally-operated current source, comprises a controllable circuit and is configured to produce a second output voltage to operate the one or more LED arrays when the line voltage is available.

The emergency-operated portion is configured to receive the primary DC voltage. The emergency-operated portion further comprises a central control circuit, a switch control circuit, and a main power supply circuit configured to pre-powers the emergency-operated portion. The switch control circuit is configured to receive a power from the main power supply circuit via a port "B". The rechargeable battery comprises a high-potential electrode and a low-potential electrode with a terminal voltage across thereon. The main power supply circuit is an isolated step-down converter configured to convert the primary DC voltage into a second DC voltage that charges the rechargeable battery to reach a nominal value of the terminal voltage. Please note that the terminal voltage of the rechargeable battery may be slightly less than the nominal value because the rechargeable battery ages or an ambient temperature is below an optimum operating temperature. When the rechargeable battery badly ages or goes wrong, the terminal voltage may be far from the nominal value. That is why the rechargeable battery test is needed to ensure that the rechargeable battery is working all the time, especially in an event of power outage. The switch control circuit comprises a first electronic switch and a bias-control circuit configured to receive the terminal voltage and to build up a bias voltage to turn on the first electronic switch regardless of whether the line voltage is available or not. The central control circuit further comprises a test portion configured to examine a fraction of the terminal voltage on the rechargeable battery. The central control circuit may further comprise a line-voltage monitor configured to detect whether the line voltage is available or not. According to this information, the central control circuit is configured to either enable or disable the first driving circuit. The first driving circuit comprises a second electronic switch. Enabling the first driving circuit comprises two processes. First, the switch control circuit must turn on the first electronic switch to allow the terminal voltage to apply on the first driving circuit. Second, the central control circuit must send a pulse train to operate the second electronic switch, consequently enabling the first driving circuit. The ground reference is electrically coupled to the low-potential electrode of the rechargeable battery to ease a charging current to flow into the rechargeable battery and to return to the main power supply circuit, completing a power transfer.

The central control circuit further comprises a gate driving circuit configured to boost an amplitude of the pulse train to drive the second electronic switch, thereby supporting rapid switching of the second electronic switch in response to the pulse train and to minimize power losses and distortion. The central control circuit further comprises an opto-coupler circuit configured to control the second driving circuit on and off. When the pulse train appears to consequently operate the first driving circuit, the optocoupler circuit is configured to pull up a sensing voltage in the controllable circuit, thereby disabling the second driving circuit. This function can eliminate an operational ambiguity when the rechargeable battery test is initiated and at the same time, the line voltage is still available. In this case, both the first output voltage and the second output voltage are simultaneously applied on the one or more LED arrays. Users cannot tell whether the rechargeable battery test is underway or not.

The central control circuit further comprises a self-diagnostic circuit comprising one or more timers. Each of the one or more timers respectively comprises multiple time delays. The multiple time delays respectively further comprise a first time delay and a second time delay. Upon an initiation of each of the one or more timers, the first time delay begins with an input voltage applied on the self-diagnostic circuit, whereas, at an end of the first time delay, an output of the self-diagnostic circuit is activated to reach a logic high level and remains activated so as to send the pulse train to enable the first driving circuit for the second time delay. At an end of the second time delay, the output of the self-diagnostic circuit is inactivated to drop to a logic low level to terminate the pulse train thereby disabling the first driving circuit. A duration over the second time delay is configured to allow the self-diagnostic circuit to integrate with the test portion and to perform the rechargeable battery test. The central control circuit further comprises a peripheral circuit configured to sample a fraction of the LED forward voltage and to deliver to the test portion to examine over the duration of the next time delay when the rechargeable battery test is initiated. The central control circuit further comprises at least one status indicator configured to show a result of the rechargeable battery test. The central control circuit further comprises a test switch configured to manually initiate the rechargeable battery test. When the rechargeable battery test is manually initiated, the self-diagnostic circuit is configured to ignore the first time delay and to activate the output of the self-diagnostic circuit to reach the logic high level and remains activated so as to send the pulse train to enable the first driving circuit for the second time delay, as mentioned above. The test switch is further configured to manually cause or trigger the self-diagnostic circuit to terminate the rechargeable battery test that is in progress.

The first driving circuit further comprises an inductor, a diode, and at least one capacitor. The first driving circuit is configured to receive the pulse train and to cut off a constant source of power from the rechargeable battery into controllable increments of energy pulses according to the pulse train, followed by a filter associated with the at least one capacitor to rebuild the controllable increments of energy pulses back into a regulated source of usable output power providing a first LED driving current to drive the one or more LED arrays. The diode is configured to block an output current when the second electronic switch is closed. When the second electronic switch is opened, the diode is configured to conduct the output current and to boost an output voltage greater than the forward voltage of the one or more LED arrays. In this sense, the diode may function as a switch. An output port "D" of the first driving circuit is directly coupled to LED+. This means that the one or more LED arrays are configured to receive the first LED driving current from the first driving circuit as long as the first driving circuit is enabled and operated.

In a second embodiment of the linear LED lamp, the main power supply circuit is configured to receive a power from a second full-wave rectifier, taking advantages of two independent power sources from two different full-wave rectifiers such that the normally-operated portion can be turned off at any time without affecting functionality of the emergency-operated portion. In this embodiment, the normally-operated portion comprises at least two electrical conductors "L"' and "N", a first full-wave rectifier, and the second driving circuit. The at least two electrical conductors "L"' and "N" are configured to couple to "L" and "N" via a power switch. The first full-wave rectifier is configured to convert the line voltage from the AC mains into a primary DC voltage. In other words, the at least two electrical conductors "L"' and "N" are coupled to a switched power, in which the normally-operated portion can be turned off when the linear LED lamp is not in use any time.

In the second embodiment of the linear LED lamp, the linear LED lamp further comprises a first end and a second end opposite to the first end. The first full-wave rectifier and the second full-wave rectifier are configured to independently receive the line voltage from the first end and the second end. Either of the first end and the second end comprises at least two electrical conductors. Each of the at least two electrical conductors is respectively coupled to the first full-wave rectifier and the second full-wave rectifier. The second full-wave rectifier is configured to power the main power supply circuit at all times.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified. Moreover, in the section of detailed description of the invention, any of a "main", a "primary", a "secondary", a "preliminary", an "initial", a "first", a "second", a "third", and so forth does not necessarily represent a part that is mentioned in an ordinal manner, but a particular one.

DETAILED DESCRIPTION OF THE INVENTION

Figure 1:
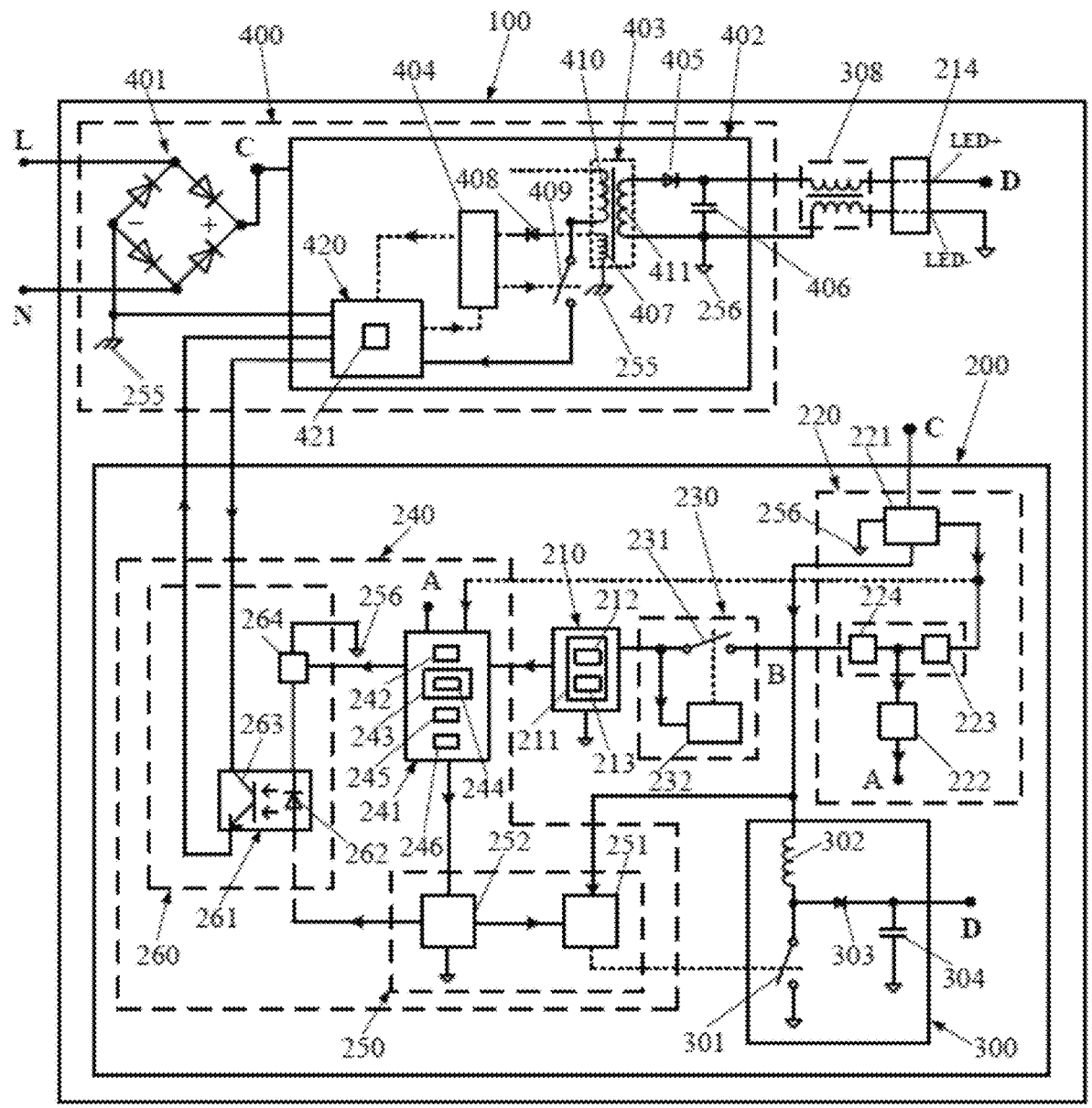
FIG. 1 is a block diagram of a linear LED lamp according to the present disclosure.

FIG. 1 is a block diagram of a linear light-emitting diode (LED) lamp according to the present disclosure. A linear LED lamp 100 is used to replace a fluorescent or an LED lamp normally operated with the AC mains in a normal mode. In FIG. 1, the linear LED lamp 100 comprises an emergency-operated portion 200 and one or more LED arrays 214 with a forward voltage across thereof. The emergency-operated portion 200 comprises a first driving circuit 300 and a rechargeable battery 210 with multiple battery protection circuits 211. The first driving circuit 300 is configured to use a power from the rechargeable battery 210 and to provide an emergency power (i.e., a voltage and a current) to drive the one or more LED arrays 214 when the line voltage from the AC mains is unavailable. The linear LED lamp 100 further comprises a normally-operated portion 400 originally designed to receive the line voltage from the AC mains for general lighting applications. The normally-operated portion 400 comprises at least two electrical conductors "L" and "N", at least one full-wave rectifier 401, and a second driving circuit 402. The at least one full-wave rectifier 401 is configured to convert the line voltage from the AC mains into a primary DC voltage. In other words, the at least two electrical conductors "L" and "N" are coupled to an un-switched power, in which the normally-operated portion 400 cannot be turned off when the linear LED lamp 100 is not in use or during nighttime. The second driving circuit 402 comprises a transformer 403 and a power switching control circuit 404. The power switching control circuit 404 is coupled to the at least one full-wave rectifier 401 and configured to allow the second driving circuit 402 to generate a second output voltage to operate the one or more LED arrays 214 at a full power when the line voltage is available. The second driving circuit 402 may further comprise a rectifier 405 and a capacitor 406. The transformer 403 comprises a first ground reference 255 and a second ground reference 256 electrically isolated from the first ground reference 255 which is connected to a negative (−) port of the at least one full-wave rectifier 401. The transformer 403 may further comprise an auxiliary winding 407 configured to provide a sustaining power via a diode 408 to operate the second driving circuit 402 after starting up. The one or more LED arrays 214 comprises a first terminal LED+ and a second terminal LED− configured to receive an LED driving current from the first terminal LED+ and to return from the second terminal LED− to either the first driving circuit 300 or the second driving circuit 402, depending on which one is an LED driving current source. The second driving circuit 402 is a normally-operated current source configured to provide the second output voltage to the one or more LED arrays 214 to operate thereon.

The second driving circuit 402 further comprises a third electronic switch 409 configured to chop the primary DC voltage into piecewise energy pulses and to regulate the second output voltage to operate the one or more LED arrays 214. The transformer 403 may further comprise a primary winding 410 and a secondary winding 411. The primary winding 410 is configured to store energy in the piecewise energy pulses when the third electronic switch 409 is turned on. When the third electronic switch 409 is turned off, the energy stored releases to generate a secondary energy pulses in the secondary winding 411. The secondary energy pulses are then rectified by the rectifier 405 and filtered by the capacitor 406 to provide the second output voltage to operate the one or more LED arrays 214. The second driving circuit 402 further comprises a controllable circuit 420 configured to turn the third electronic switch 409 on and off so as to regulate the second output voltage to operate the one or more LED arrays 214. The controllable circuit 420 may comprise a current sensing circuit 421 coupled to the third electronic switch 409 to monitor an electric current flowing through the third electronic switch 409 cycle by cycle. When the electric current reaches a threshold, the power switching control circuit 404 controls the third electronic switch 409 to stop chopping the primary DC voltage, thereby disabling the second driving circuit 402.

In FIG. 1, the emergency-operated portion 200 further comprises a switch control circuit 230 and a main power supply circuit 220 configured to provide a major DC power to the switch control circuit 230 and the rechargeable battery 210. The emergency-operated portion 200 further comprises a central control circuit 240 comprising a control device 241 configured to produce a pulse train with a predetermined duty cycle to operate the first driving circuit 300 in response to either a rechargeable battery test or a power outage. The switch control circuit 230 comprises a first electronic switch 231 and is configured to receive the major DC power from the main power supply circuit 220 via a port "B". The rechargeable battery 210 comprises a high-potential electrode coupled to the port "B" via the first electronic switch 231 and a low-potential electrode at the second ground reference 256 with a terminal voltage across the two electrodes.

The main power supply circuit 220 comprises a main switching power supply 221 comprising a first supply line and a second supply line. The main switching power supply 221 is an isolated step-down converter configured to provide a DC voltage that charges the rechargeable battery 210 via the second supply line to reach a nominal value of the terminal voltage. Please note that the terminal voltage of the rechargeable battery 210 may be slightly less than the nominal value because the rechargeable battery 210 ages or an ambient temperature is below an optimum operating temperature. When the rechargeable battery 210 badly ages or goes wrong, the terminal voltage may be far from the nominal value. That is why the rechargeable battery test is needed to ensure that the rechargeable battery 210 is working all the time, especially in an event of power outage. In short, the rechargeable battery test is configured to test a sustainable power of the rechargeable battery 210 to operate the linear LED lamp 100 over a certain period of time, simulating the power outage. The switch control circuit 230 further comprises a bias control circuit 232 configured to receive a voltage from the rechargeable battery 210 to build up an operating voltage to enable the first electronic switch 231 regardless of whether the line voltage is available or not. When the first electronic switch 231 is on, a voltage greater than the terminal voltage from the main switching power supply 221 via the second supply line applied at the port "B" is configured to charge the rechargeable battery 210. During the power outage, the first electronic switch 231 remains "on" because of a bias voltage provided by the bias control circuit 232. In this case, the terminal voltage appears at the port "B" and is ready to provide an emergency power to the first driving circuit 300. The first driving circuit 300 comprises a second electronic switch 301, an inductor 302, a diode 303, and at least one capacitor 304. The first driving circuit 300 is configured to build up a first output voltage greater than the forward voltage to operate the one or more LED arrays 214 when the line voltage is not available.

The control device 241 in the central control circuit 240 further comprises a test portion 242 configured to examine a fraction of the terminal voltage on the rechargeable battery 210. Depending on types of the rechargeable battery 210, a lithium ion type or a nickel hydrogen type, the multiple battery protection circuits 211 may comprise a plurality of pairs of metal-oxide-semiconductor field-effect transistors (MOSFETs) 212. Each of the plurality of pairs of MOSFETs 212 connected in series are configured to block electric current to flow into and out of the rechargeable battery 210, preventing the rechargeable battery 210 from damage due to overcharge, over-discharge, and over-current. The multiple battery protection circuits 211 may comprise at least one thermal protector 213 configured to regulate a charging current and a discharging current of the rechargeable battery 210 in response to a temperature measured on the rechargeable battery 210. The control device 241 in the central control circuit 240 may further comprise a line-voltage monitor (shown as a dash line between the control device 241 and the main switching power supply 221) configured to detect whether the line voltage is available or not. According to this information, the central control circuit 240 is configured to either produce the pulse train to operate the first driving circuit 300 by turning the second electronic switch 301 on and off in response to the pulse train or disable the first driving circuit 300 by stopping the pulse train. In FIG. 1, the main power supply circuit 220 further comprises a low-dropout regulator 222 and a pair of diodes 223 and 224. Each diode 223 or 224 is configured to respectively allow a power from either the main switching power supply 221 via the first supply line or the rechargeable battery 210 to supply into the low-dropout regulator 222 configured to regulate an output voltage to operate the central control circuit 240 via a port "A". In FIG. 1, the second ground reference 256 is electrically coupled to the low-potential electrode of the rechargeable battery 210 and the main switching power supply 221 to ease a charging current to flow into the rechargeable battery 210 and to return to the main switching power supply 221, completing a power transfer. The second electronic switch 301 comprises a first at least one metal-oxide-semiconductor field-effect transistor (MOSFET). The first electronic switch 231 comprises a second at least one MOSFET configured to couple between the rechargeable battery 210 and the main switching power supply 221 and to be controlled by the bias control circuit 232.

In FIG. 1, the central control circuit 240 further comprises a gate driving circuit 250 configured to boost an amplitude of the pulse train, thereby supporting rapid switching of the second electronic switch 301 in response to the pulse train and to minimize power losses and distortion. The amplitude of the pulse train is inherently limited by a supplied voltage from the low-dropout regulator 222 and not large enough to efficiently drive the second electronic switch 301. The gate driving circuit 250 is thus needed to convert the pulse train into a gate driving pulse train with an amplitude close to the terminal voltage to drive the second electronic switch 301 so as to support rapid switching of the second electronic switch 301. In this sense, the gate driving circuit 250 produces the gate driving pulse train that simulates the pulse train with the predetermined duty cycle. The central control circuit 240 further comprises an optocoupler circuit 260 configured to control the second driving circuit 402 on and off. When the pulse train appears to operate the first driving circuit 300, the optocoupler circuit 260 is configured to pull up a sensing voltage in the current sensing circuit 421 of the controllable circuit 420, thereby disabling the second driving circuit 402. The gate driving circuit 250 comprises one or more electronic switches configured to facilitate a turn-on and a turn-off switching of the second electronic switch 301 without interfering with an optical signal generated from the optocoupler circuit 260. In another sense, the one or more electronic switches may comprise a first at least one bipolar junction transistor (BJT) 251 configured to couple to the second electronic switch 301 to drive thereof. The one or more electronic switches may further comprise a second at least one BJT 252 configured to receive the pulse train from the control device 241 to drive the first at least one BJT 251.

The optocoupler circuit 260 comprises an optocoupler 261 comprising an infrared emitting diode 262 and a phototransistor 263 configured to receive the optical signal emitting from the infrared emitting diode 262. The second at least one BJT 252 is further configured to relay the pulse train and to operate the infrared emitting diode 262. During the rechargeable battery test, the second at least one BJT 252 receives the pulse train from the control device 241, and, simultaneously, the optocoupler circuit 260 is activated. In this case, the phototransistor 263 receives the optical signal emitting from the infrared emitting diode 262 and conducts current from and to the current sensing circuit 421 of the controllable circuit 420 to pull up a sensing voltage, thereby disabling the second driving circuit 402. The optocoupler circuit 260 may further comprise a transistor circuit 264 controlled by the control device 241 to enhance a signal-to-noise ratio of the optical signal. In the second driving circuit 402, the third electronic switch 409 may comprise a third at least one metal-oxide-semiconductor field-effect transistor (MOSFET). That is, when the phototransistor 263 is activated, the third at least one MOSFET is deactivated, thereby disabling the second driving circuit 402.

In FIG. 1, the control device 241 in the central control circuit 240 further comprises a self-diagnostic circuit 243 comprising one or more timers 244. Each of the one or more timers 244 respectively comprises multiple time delays, whereas the multiple time delays of each of the one or more timers 244 respectively further comprise a first time delay and a second time delay. Upon an initiation of each of the one or more timers 244, the first time delay begins with an input voltage applied on the self-diagnostic circuit 243. At an end of the first time delay, the output of the self-diagnostic circuit 243 is activated to reach the logic high level and remains activated so as to send the pulse train to enable the first driving circuit 300 for the second time delay, wherein, at an end of the second time delay, the output of the self-diagnostic circuit 243 is inactivated to drop to the logic low level to terminate the pulse train thereby disabling the first driving circuit. A duration over the second time delay is configured to allow the self-diagnostic circuit 243 to integrate with the test portion 242 and to perform the rechargeable battery test. When the rechargeable battery test is initiated, the central control circuit 240 is configured to inactivate the second driving circuit 402. The control device 241 in the central control circuit 240 may further comprise a peripheral circuit configured to sample a fraction of an LED forward voltage and to deliver to the test portion 242 to examine over the duration of the next time delay when the rechargeable battery test is initiated. The control device 241 in the central control circuit 240 may further comprise at least one status indicator 245 configured to show statuses of the LED lamp 100. The statuses comprise results of either charging or the rechargeable battery test. The control device 241 in the central control circuit 240 may further comprise a test switch 246 configured to manually initiate the rechargeable battery test. When the rechargeable battery test is manually initiated, the self-diagnostic circuit 243 is configured to ignore the first time delay and to activate the output of the self-diagnostic circuit 243 to reach the logic high level and remains activated so as to enable the first driving circuit 300 for the second time delay. At an end of the second time delay, the output of the self-diagnostic circuit 243 is inactivated to drop to the logic low level, and wherein a duration over the second time delay is configured to allow the self-diagnostic circuit 243 to integrate with the test portion 242 and to perform a rechargeable battery test, as mentioned above. The test switch 246 is further configured to manually cause or trigger the self-diagnostic circuit 243 to terminate the rechargeable battery test that is in progress. In FIG. 1, the linear LED lamp 100 may further comprise a common-mode choke 308 configured to interface between the second driving circuit 402 and the one or more LED arrays 214 and to improve switching between the second driving circuit 402 and the first driving circuit 300 to drive the one or more LED arrays 214.

Figure 2:
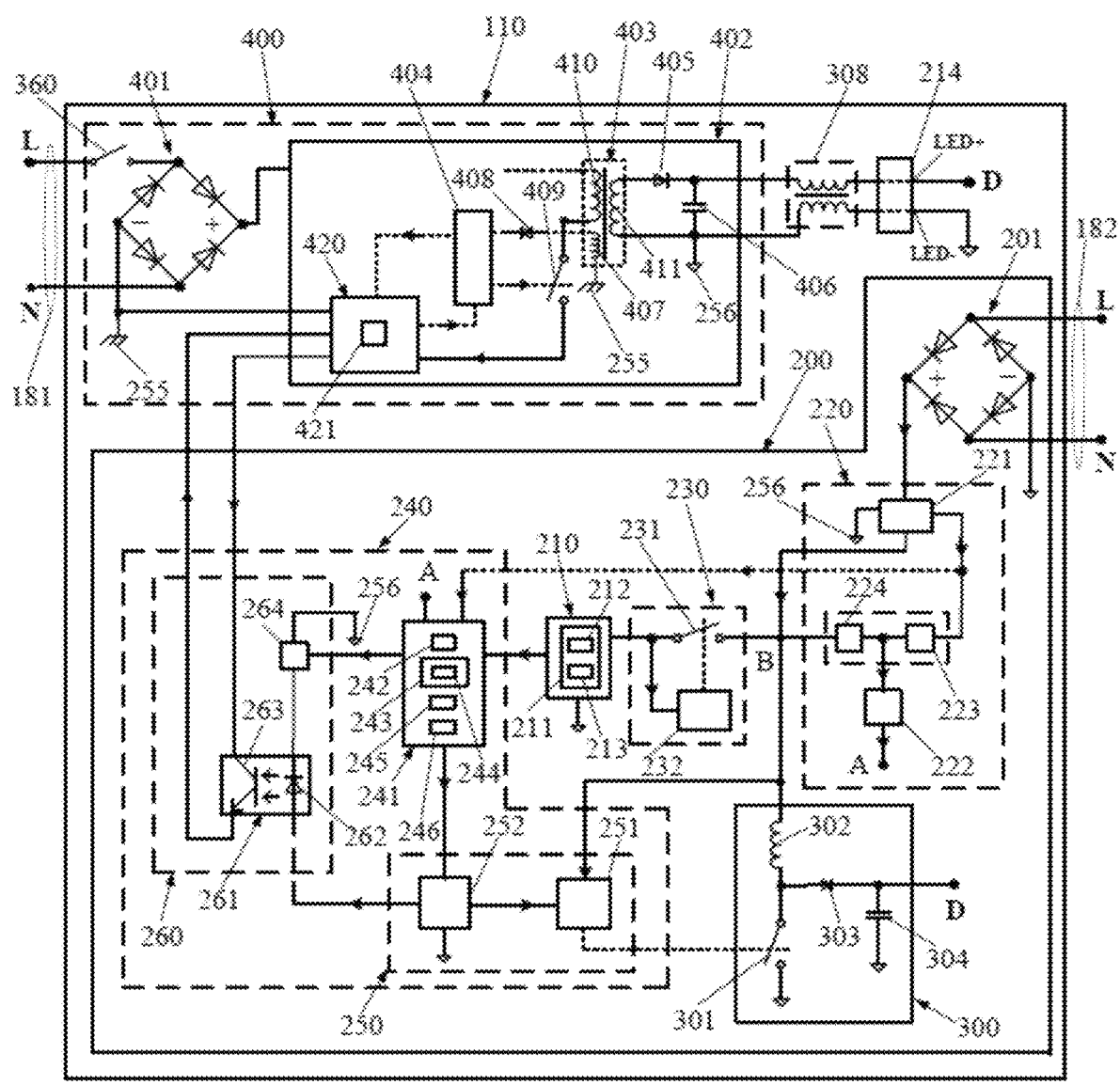
FIG. 2 is a second embodiment of the linear LED lamp according to the present disclosure.

FIG. 2 is a second embodiment of the linear LED lamp according to the present disclosure. FIG. 2 is almost the same as FIG. 1, except that the main power supply circuit 220 in FIG. 2 is specifically configured to receive a power from a second full-wave rectifier 410, taking advantages of having two independent power sources from two different full-wave rectifiers such that the normally-operated portion 311 can be turned off at any time without affecting functionality of the emergency-operated portion 200. Besides, in FIG. 2, the linear LED lamp 110 comprises the normally-operated portion 400 comprising at least two electrical conductors "L'" and "N'", a first full-wave rectifier 401, and the second driving circuit 402. The at least two electrical conductors "L'" and "N'" are configured to couple to "L" and "N" via a power switch 360. The first full-wave rectifier 401 is configured to convert the line voltage from the AC mains into a primary DC voltage. In other words, the at least two electrical conductors "L'" and "N'" are coupled to a switched power, in which the normally-operated portion 400 can be turned off when the linear LED lamp 110 is not in use any time.

In FIG. 2, the linear LED lamp 110 further comprises a first end 181 and a second end 182 opposite to the first end 181. The first full-wave rectifier 401 and the second full-wave rectifier 201 are configured to independently receive the line voltage, with the first full-wave rectifier 401 from a switched line voltage and with the second full-wave rectifier 201 from an un-switched line voltage. Either of the first end 181 and the second end 182 comprises at least two electrical conductors, wherein each of the at least two electrical conductors is respectively coupled to the first full-wave rectifier 401 and the second full-wave rectifier 201. The second full-wave rectifier 201 is thus configured to power the main power supply circuit 220 at all times. The second full-wave rectifier 201 is coupled to the at least two electrical conductors "L" and "N" and configured to convert the line voltage into a secondary DC voltage further powering the main switching power supply 221. The main switching power supply 221 is an isolated step-down converter, as depicted in FIG. 1.

Figure 3:
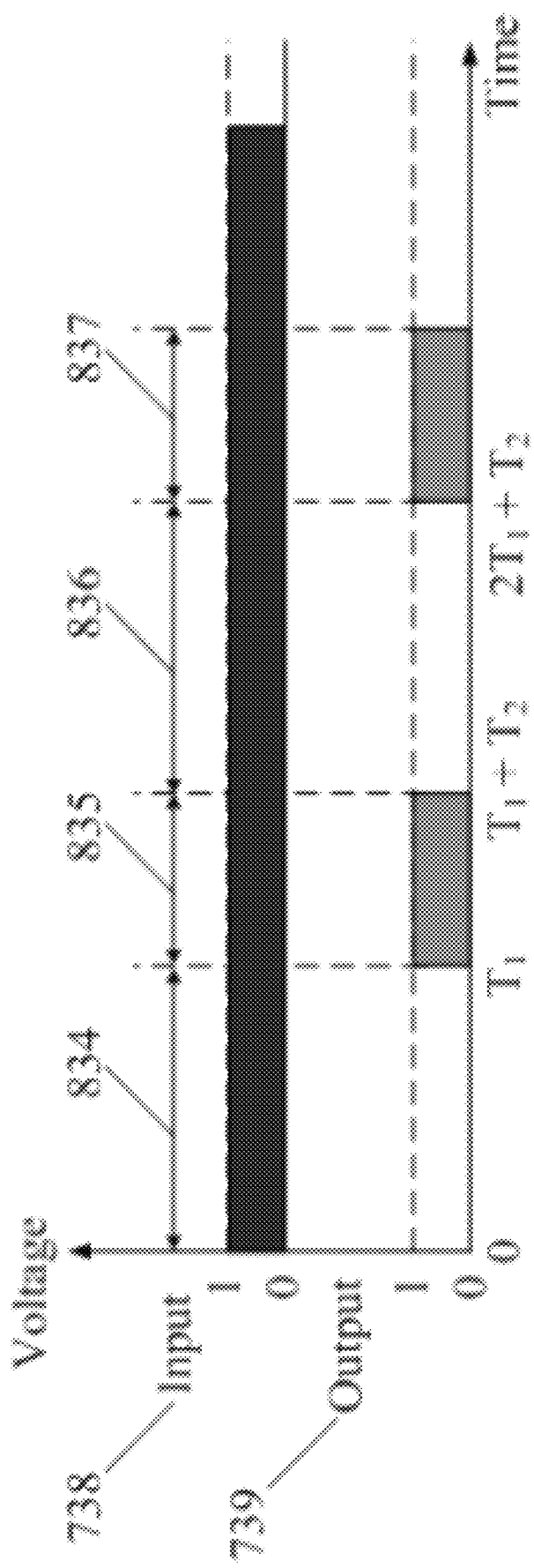
FIG. 3 is a timing diagram of a self-diagnostic circuit according to the present disclosure.

FIG. 3 is a timing diagram of a self-diagnostic circuit according to the present disclosure. As mentioned in depicting FIG. 1, the self-diagnostic circuit 243 comprises the one or more timers 244 and the test portion 242, which, in one embodiment, may be implemented in hardware as an electronic circuit. Each of the one or more timers 244 respectively comprises multiple time delays comprising at least one initial time delay 834 with a duration of $T_1$ and a next time delay 835 with a duration of $T_2$ immediately followed the at least one initial time delay 834. Upon an initiation of each of the one or more timers 244, the at least one initial time delay 834 begins with an input voltage 738 applied. At the end of the at least one initial time delay 834, an output 739 of the self-diagnostic circuit 243 is activated to reach the logic high level (i.e. "1" state) and remains activated so as to enable the first driving circuit 300 and the test portion 242 for the next time delay 835. At the end of the next time delay 835, the output 739 of the self-diagnostic circuit 243 is inactivated to drop to the logic low level (i.e. "0" state). The at least one initial time delay 834 and the next time delay 835 form a primary sequence with a duration of $T_1+T_2$. The primary sequence with the duration of $T_1+T_2$ repeats (836 and 837, for example) until the terminal voltage (FIG. 1) is removed from the self-diagnostic circuit 243. In FIG. 3, the input 738 shown comprises two states "0" and "1", in which "0" means no voltage appeared at the input 738 of the self-diagnostic circuit 243 whereas "1" means the terminal voltage is applied. Similarly, the output 739 shown comprises two states "0" and "1", in which "0" means no voltage appeared or being inactivated at the output 739 of the self-diagnostic circuit 243 whereas "1" means that the output 739 of the self-diagnostic circuit 243 provides an output high-level voltage or is activated. The duration $T_2$ over the next time delay 835 is configured (e.g., being sufficiently long) to allow the self-diagnostic circuit 243 to perform the rechargeable battery test. In other words, during the next time delay 835, the self-diagnostic circuit 243 allows the control device 241 (FIGS. 1~2) to send the pulse train to consequently enable the first driving circuit 300 by activating the second electronic switch 301. The respective at least one initial time delay 734 comprises a nominal duration of 30 days. The respective next time delay 835 comprises a nominal duration of 30 seconds. The primary sequence with the duration of $T_1+T_2$ repeats (836 and 837, for example) 11 times. At the twelfth time (i.e. the twelfth month), the respective next time delay 835 comprises a nominal duration of 90 minutes. Afterwards, the primary sequence repeats until the terminal voltage (FIG. 1) is removed from the self-diagnostic circuit 243.

Figure 4:
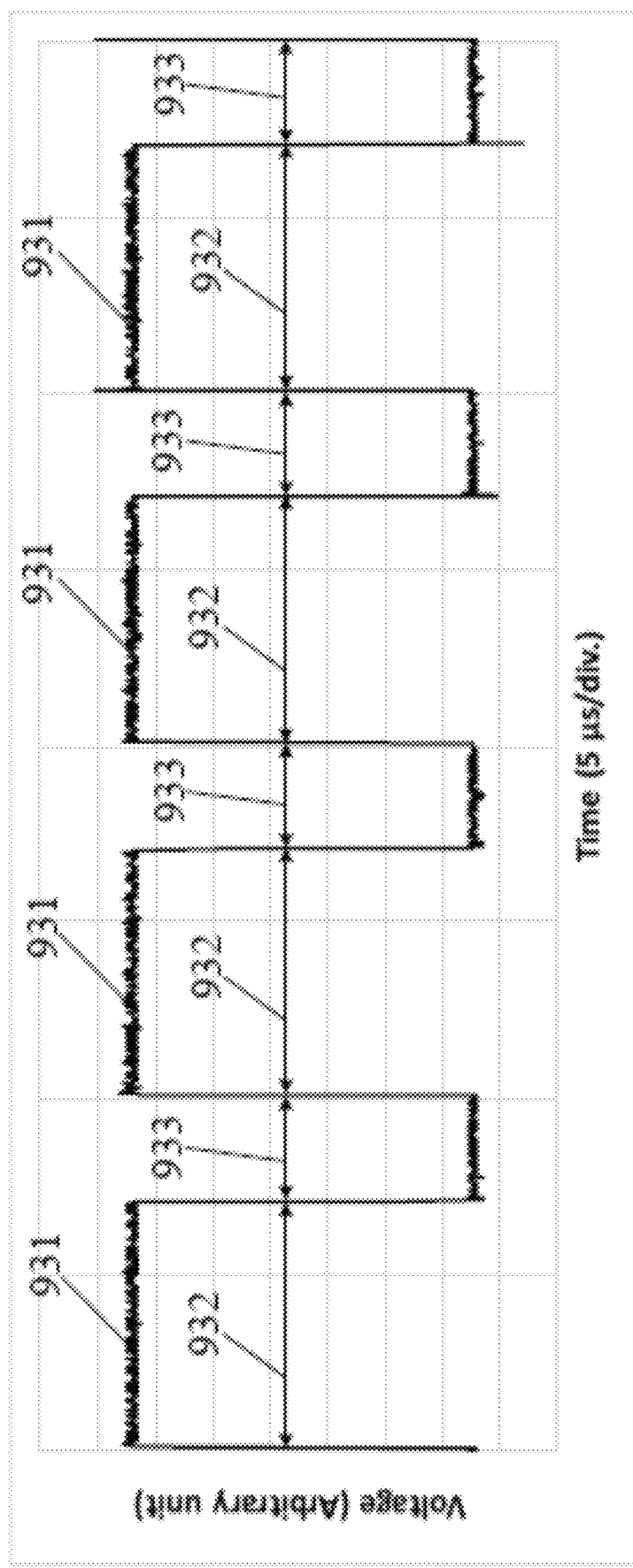
FIG. 4 is an example of a pulse train produced to build up a first output voltage to operate one or more LED arrays according to the present disclosure.

FIG. 4 is an example of the pulse train with a duty cycle to control the first output voltage according to the present disclosure. In FIG. 4, according to the pulse train, the first driving circuit 300 cuts off a DC voltage with its value close to the terminal voltage from the rechargeable battery 210 as an input DC voltage into a plurality of controllable increments of energy pulses, followed by a filter associated with the at least one capacitor 304 (in FIGS. 1~2) to rebuild the plurality of controllable increments of energy pulses back into a regulated output voltage, which is a usable output voltage to drive the one or more LED arrays. In FIG. 4, the pulse train produced by the control device 241 (FIGS. 1~2) comprises a periodic non-sinusoidal waveform. A pulse waveform in the pulse train is also known as a rectangular wave. As shown, each pulse waveform comprises an amplitude 931, an on-time duration 932 of $t_{on}$, which is 7.1 microseconds (µs), and an off-time duration 933 of $t_{off}$. A duty cycle $\Delta$ can be calculated according to a formula: $\Delta = t_{on}/t_{on}+t_{off}$. The amplitude 931 is limited by a supplied voltage from the low-dropout regulator 222 and not large enough to efficiently drive the second electronic switch 301. That is why the gate driving circuit 250 is needed to convert the amplitude 931 into a driving voltage close to the terminal voltage to drive the second electronic switch 301 so as to support rapid switching of the second electronic switch 301 in response to the pulse train and to minimize power losses and distortion, as mentioned. In this sense, the gate driving circuit 250 produces a gate driving pulse train that simulates the pulse train with the predetermined duty cycle. When the gate driving pulse train is applied on the first driving circuit 300, the second electronic switch 301 cuts off the DC voltage from the terminal voltage as the input DC voltage $V_{in}$. The first output voltage $V_{out,1}$ used to drive the one or more LED arrays 214 is in the first order according to $V_{out,1} = V_{in}/1-\Delta$. As the duty cycle $\Delta$ is always less than 100%, the first output voltage $V_{out,1}$ is always greater than the input DC voltage $V_{in}$. Therefore, by controlling the duty cycle of the pulse train, the first output voltage $V_{out,1}$ can be controlled to be greater than the forward voltage of the one or more LED arrays 214 to drive thereof without flickering.

The self-diagnostic circuit 243 may comprise a microcontroller, a microchip, or a programmable logic controller. In this disclosure, the emergency-operated portion 200 is integrated into the linear LED lamp 100 or 110 with the self-diagnostic circuit 243 to auto-test charging and discharging current of a rechargeable battery 210 with test results displayed in the status indicator 245 (FIGS. 1~2), supporting dual mode operations of the linear LED lamp 100 or 110 to work not only in a normal mode but also in an emergency mode.

Whereas preferred embodiments of the present disclosure have been shown and described, it will be realized that alterations, modifications, and improvements may be made thereto without departing from the scope of the following claims. Another kind of schemes with an emergency-operated portion with switch control circuits, a pulse train, and multiple timers and multiple time delays adopted to operate a linear LED lamp using various kinds of combinations to accomplish the same or different objectives could be easily adapted for use from the present disclosure. Accordingly, the foregoing descriptions and attached drawings are by way of example only and are not intended to be limiting.

What is claimed is:
1. A linear light-emitting diode (LED) lamp, comprising:
at least two electrical conductors configured to couple to a line voltage from alternate-current (AC) mains;
one or more LED arrays with a forward voltage across the one or more LED arrays;
a rechargeable battery with a terminal voltage across thereon and multiple battery protection circuits;
at least one full-wave rectifier coupled to the at least two electrical conductors and configured to convert the line voltage into a primary direct-current (DC) voltage;
a main power supply circuit coupled to the at least one full-wave rectifier and configured to convert the primary DC voltage into a main DC voltage;
a switch control circuit comprising a first electronic switch and a bias-control circuit configured to receive the terminal voltage and to build up a bias voltage to turn on the first electronic switch regardless of whether the line voltage is available or not;
a first driving circuit comprising a second electronic switch, an inductor, a diode, and at least one capacitor, the first driving circuit configured to receive a power from the rechargeable battery to build up a first output voltage greater than the forward voltage to operate the one or more LED arrays when the line voltage is not available;
a second driving circuit comprising a controllable circuit and configured to produce a second output voltage to operate the one or more LED arrays when the line voltage is available; and
a central control circuit comprising a control device configured to produce a pulse train with a predetermined duty cycle to operate the first driving circuit in response to either a rechargeable battery test or a power outage,
wherein:
the second driving circuit further comprises a third electronic switch configured to chop the primary DC voltage into piecewise energy pulses and to regulate the second output voltage to operate the one or more LED arrays;

the first driving circuit is further configured to boost, according to the predetermined duty cycle, the terminal voltage to the first output voltage to operate the one or more LED arrays without flickering; and the rechargeable battery test is configured to test a sustainable power of the rechargeable battery to operate the linear LED lamp over a certain period of time in simulating the power outage.

2. The linear light-emitting diode (LED) lamp of claim 1, wherein the second electronic switch comprises a first at least one metal-oxide-semiconductor field-effect transistor (MOSFET).

3. The linear light-emitting diode (LED) lamp of claim 2, wherein the first electronic switch comprises a second at least one metal-oxide-semiconductor field-effect transistor (MOSFET) coupled between the rechargeable battery and the main power supply circuit and controlled by the bias control circuit.

4. The linear light-emitting diode (LED) lamp of claim 1, wherein the central control circuit further comprises a gate driving circuit configured to boost an amplitude of the pulse train to drive the second electronic switch, thereby supporting rapid switching of the second electronic switch in response to the pulse train and to minimize power losses and distortion.

5. The linear light-emitting diode (LED) lamp of claim 4, wherein the central control circuit further comprises an optocoupler circuit configured to control the second driving circuit on and off, and wherein, when the pulse train appears to consequently operate the first driving circuit, the optocoupler circuit is configured to pull up a sensing voltage in the controllable circuit, thereby disabling the second driving circuit.

6. The linear light-emitting diode (LED) lamp of claim 5, wherein the gate driving circuit comprises one or more electronic switches configured to facilitate a turn-on and a turn-off switching of the second electronic switch without interfering with an optical signal generated from the optocoupler circuit.

7. The linear light-emitting diode (LED) lamp of claim 6, wherein the one or more electronic switches comprise a first at least one bipolar junction transistor (BJT) coupled to the terminal voltage and configured to boost the pulse train and to drive the second electronic switch.

8. The linear light-emitting diode (LED) lamp of claim 7, wherein the one or more electronic switches further comprise a second at least one BJT configured to receive the pulse train to drive the first at least one BJT.

9. The linear light-emitting diode (LED) lamp of claim 8, wherein the optocoupler circuit comprises an optocoupler comprising an infrared emitting diode and a phototransistor configured to receive the optical signal emitting from the infrared emitting diode, and wherein the second at least one BJT is further configured to relay the pulse train and to operate the infrared emitting diode.

10. The linear light-emitting diode (LED) lamp of claim 9, wherein the third electronic switch comprises a third at least one metal-oxide-semiconductor field-effect transistor (MOSFET), and wherein, when the phototransistor is activated, the third at least one MOSFET is deactivated, thereby disabling the second driving circuit.

11. The linear light-emitting diode (LED) lamp of claim 1, wherein the multiple battery protection circuits comprise a plurality of pairs of metal-oxide-semiconductor field-effect transistors (MOSFETs), and wherein each of the plurality of pairs of MOSFETs connected in series are configured to block electric current to flow into and out of the rechargeable battery, preventing the rechargeable battery from damage due to overcharge, over-discharge, and over-current.

12. The linear light-emitting diode (LED) lamp of claim 1, wherein the multiple battery protection circuits comprise at least one thermal protector configured to regulate a charging current and a discharging current of the rechargeable battery in response to a temperature measured on the rechargeable battery.

13. The linear light-emitting diode (LED) lamp of claim 1, wherein the main power supply circuit comprises a main switching power supply, a low-dropout regulator, and a pair of diodes, wherein each of the pair of diodes is configured to respectively allow a power from either the main switching power supply or the rechargeable battery to supply into the low-dropout regulator, and wherein the low-dropout regulator is configured to regulate an output voltage to operate the central control circuit.

14. The linear light-emitting diode (LED) lamp of claim 1, wherein the control device comprises a self-diagnostic circuit comprising one or more timers, wherein each of the one or more timers respectively comprises multiple time delays, wherein the multiple time delays respectively further comprise a first time delay and a second time delay, wherein, upon an initiation of each of the one or more timers, the first time delay begins with an input voltage applied on the self-diagnostic circuit, wherein, at an end of the first time delay, an output of the self-diagnostic circuit is activated to reach a logic high level and remains activated so as to allow the pulse train to enable the first driving circuit for the second time delay, wherein, at an end of the second time delay, the output of the self-diagnostic circuit is inactivated to drop to a logic low level to terminate the pulse train, thereby disabling the first driving circuit, and wherein a duration over the second time delay is configured to allow the self-diagnostic circuit to perform the rechargeable battery test.

15. The linear light-emitting diode (LED) lamp of claim 14, wherein the central control circuit further comprises a test portion configured to examine a fraction of the terminal voltage on the rechargeable battery over a duration of the second time delay when the rechargeable battery test is initiated.

16. The linear light-emitting diode (LED) lamp of claim 1, further comprising:
a first end and a second end opposite to the first end,
wherein the at least one full-wave rectifier further comprises a first full-wave rectifier and a second full-wave rectifier each configured to independently receive the line voltage,
wherein either of the first end and the second end comprises at least two electrical conductors,
wherein each of the at least two electrical conductors is respectively coupled to the first full-wave rectifier and the second full-wave rectifier, and
wherein the second full-wave rectifier is configured to power the main power supply circuit at all times.

17. The linear light-emitting diode (LED) lamp of claim 1, wherein the central control circuit further comprises at least one status indicator configured to show statuses of the LED lamp.

18. The linear light-emitting diode (LED) lamp of claim 17, wherein the statuses comprise results of either charging or the rechargeable battery test.

19. The linear light-emitting diode (LED) lamp of claim 1, wherein the central control circuit further comprises a test switch configured to manually initiate and terminate the rechargeable battery test.

* * * * *